(12) United States Patent  
Sako (10) Patent No.: US 7,858,051 B2
(45) Date of Patent: Dec. 28, 2010

(54) POLLUTION CONTROL ELEMENT MOUNTING SYSTEM AND POLLUTION CONTROL DEVICE

(75) Inventor: Kenji Sako, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 471 days.

(21) Appl. No.: 11/572,075

(22) PCT Filed: Jul. 15, 2005

(86) PCT No.: PCT/US2005/025206

§ 371 (c)(1),
(2), (4) Date: Nov. 9, 2007

(87) PCT Pub. No.: WO2006/020058

PCT Pub. Date: Feb. 23, 2006

(65) Prior Publication Data

US 2008/0175764 A1    Jul. 24, 2008

Related U.S. Application Data

(60) Provisional application No. 60/588,196, filed on Jul. 15, 2004.

(51) Int. Cl.
*B01D 50/00*    (2006.01)
(52) U.S. Cl. .................................................. 422/179
(58) Field of Classification Search ................. 422/168, 422/177, 179, 180
See application file for complete search history.

(56) References Cited

U.S. PATENT DOCUMENTS

| | | | |
|---|---|---|---|
| 3,313,737 A | 4/1967 | Brinsmead et al. | |
| 3,441,381 A | 4/1969 | Keith et al. | |
| RE27,747 E | 9/1973 | Johnson | |
| 3,771,967 A | 11/1973 | Nowak | |
| 3,798,006 A | 3/1974 | Balluff | |
| 3,861,881 A | 1/1975 | Nowak | |
| 5,250,269 A | 10/1993 | Langer et al. | |
| 5,955,177 A | 9/1999 | Sanocki et al. | |
| 6,025,455 A | 2/2000 | Yoshitake et al. | |
| 6,051,193 A | 4/2000 | Langer et al. | |

(Continued)

FOREIGN PATENT DOCUMENTS

EP    1 418 317 A1    5/2004

(Continued)

OTHER PUBLICATIONS

Stroom et al., System Approach to Packaging Design for Automotive Catalytic Converters, SAE # 900500, International Congress and Exposition, Detroit, MI, Feb. 26-Mar. 2, 1990.

(Continued)

*Primary Examiner*—Tom Duong
(74) *Attorney, Agent, or Firm*—Harold C. Kencht, III (57) ABSTRACT

A pollution control element mounting system comprising a mat of a fiber material and fine particles of an abrasive material provided on an inner peripheral surface of the mat at least on the side intended to contact the pollution control element. A pollution control device comprising a casing, a pollution control element and the mounting system disposed between the casing and the pollution control element.

20 Claims, 4 Drawing Sheets

U.S. PATENT DOCUMENTS

| | | | |
|---|---|---|---|
| 6,224,835 B1 * | 5/2001 | Langer | ............... 422/179 |
| 6,960,386 B2 | 11/2005 | Agata | |
| 6,967,006 B1 | 11/2005 | Wirth et al. | |
| 2002/0127154 A1 | 9/2002 | Foster et al. | |
| 2003/0129102 A1 | 7/2003 | Turek et al. | |
| 2004/0097600 A1 | 5/2004 | Reenwood et al. | |
| 2006/0008395 A1 | 1/2006 | Ten Eyck et al. | |
| 2009/0025377 A1 | 1/2009 | Yasuda et al. | |

FOREIGN PATENT DOCUMENTS

| | | |
|---|---|---|
| JP | 2001-259438 | 9/2001 |
| JP | 2002-206421 A | 7/2002 |
| WO | 99/39086 | 8/1999 |
| WO | WO 2006/020058 A1 | 2/2006 |
| WO | 2007/030410 | 3/2007 |

OTHER PUBLICATIONS

J.S. Howitt, "Thin Wall Ceramics as Monolithic Catalyst Support" SAE # 800082, Congress and Exposition, Cobo Hall, Detroit, Feb. 25-29, 1980.

Howitt et al., "Flow Effect in Monolithic Honeycomb Automotive Catalytic Converter", SAE # 740244, Automotive Engineering Congress, Detroit, MI, Feb. 25-Mar. 1, 1974.

Hawley's Condensed Chemical Dictionary, $12^{th}$ Edition, New York, 1993.

Colloidal Silica Fundamentals and Applications, "Applications of Colloidal Silica: Present, and Future", Charles C. Payne, Taylor & Francis Group, 2006, pp. 714-719.

Fiberfax® Ceramic Fiber Product Specification, Unifrax, Niagara Falls, NY, 1996.

* cited by examiner

POLLUTION CONTROL ELEMENT MOUNTING SYSTEM AND POLLUTION CONTROL DEVICE

CROSS REFERENCE RELATED APPLICATIONS

This application is a national stage filing under 35 U.S.C. 371 of PCT/US2005/025206 filed Jul. 15, 2005, which claims priority to U.S. patent application Ser. No. 60/588196; filed Jul. 15, 2004, the disclosure of which is incorporated by reference in its/their entirety herein.

FIELD OF THE INVENTION

This invention relates to a mounting system for a pollution control element (e.g., a catalyst support, filter element, etc.), in particular, to a mounting system for a pollution control element suitable for use in processing exhaust gases from an internal combustion engine such as, for example, that used in a vehicle (e.g., an automobile, aircraft or watercraft) or power generator and, more particularly, to a mounting system that is able to better hold the pollution control element within the pollution control device. The invention further relates to a pollution control device having such a mounting system for the pollution control element.

BACKGROUND OF THE INVENTION

An exhaust gas purification system using a ceramic catalytic converter as means for removing carbon monoxide (CO), hydrocarbon (HC), nitrogen oxides (NOx), etc, contained in an exhaust gas of a car engine from the exhaust gas is well known. The ceramic catalytic converter basically accommodates a honeycomb-shaped ceramic catalyst support (also called "catalyst element") in a metal casing or housing.

Various kinds of ceramic catalytic converters are available as is well known in the art. Generally, the ceramic catalytic converters employ a construction in which a clearance or gap between a catalyst support disposed in a casing and the casing is filled with a heat insulating/mounting material typically comprising the combination of an inorganic fiber with an organic fiber and/or a generally liquid or paste-like organic binder. As a result, the heat insulating/mounting material filling the clearance or gap retains the catalyst support and can prevent a mechanical shock resulting from impact, vibration, and so forth, from accidentally acting on the catalyst support. In the catalytic converters having such a construction, breaking and movement of the catalyst support do not occur and an intended operation can be accomplished for an extended period. Incidentally, when such a heat insulating/mounting material is in a form that functions to retain or mount the catalyst support, it is generally called a "catalyst support mounting system", too.

Figure 1:
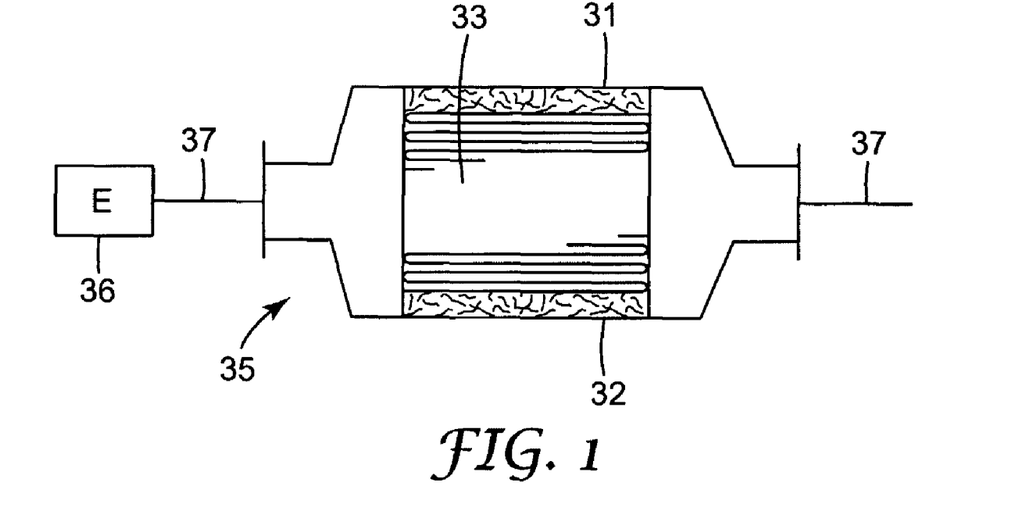
FIG. 1 is a sectional view showing a construction of a catalytic converter according to the prior art.
Figure 2:
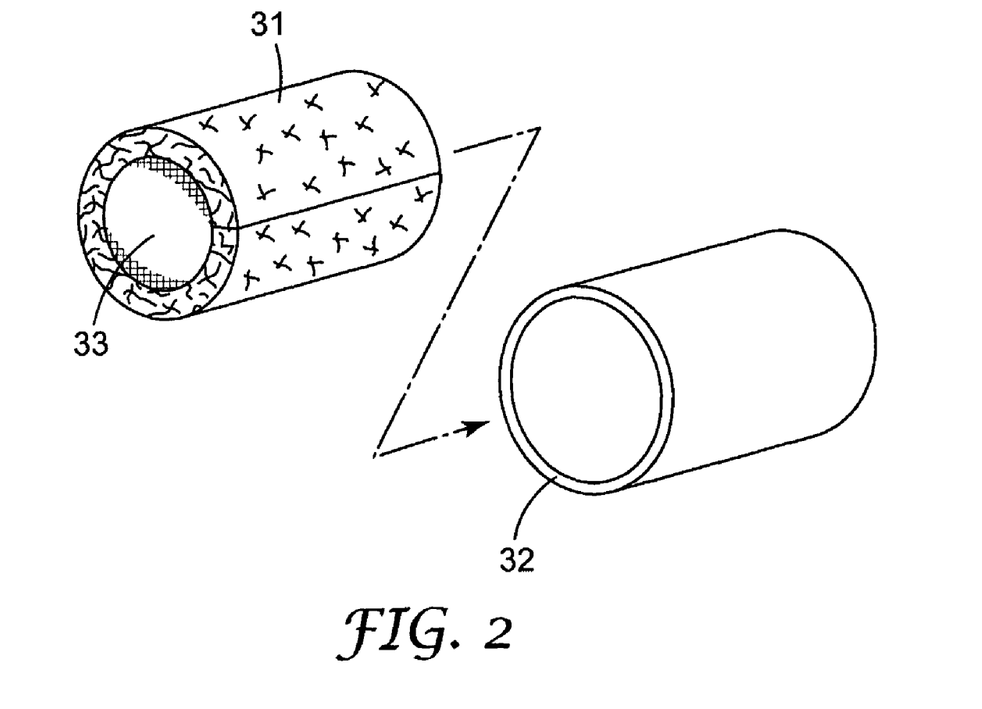
FIG. 2 is a perspective view showing a method of pushing a catalyst support into a metal casing in the catalytic converter shown in FIG. 1.

Incidentally, when the catalyst support is loaded into the casing, a push-in system that winds the catalyst support mounting system around an outer circumference of the catalyst support, integrates them together and then pushes the integrated body into a cylindrical casing under pressure has generally been employed. Various types of catalyst support mounting systems have been proposed at present in order to improve the ability to assemble the catalyst support in a catalytic converter using the push-in system (called "canning"), to improve a cushion property (resiliency) of the catalyst support mounting system and to prevent scattering of inorganic fiber used in the catalyst support mounting system in air. As shown in FIG. 1, for example, in a catalytic converter 35 including a catalyst support 33, a metal shell (casing) 32 covering an outer periphery of the catalyst support 33 and a retaining seal member 31 interposed between the catalyst support 33 and the casing 32, a catalyst support mounting system which comprises an inorganic fiber mat subjected to needle punch treatment into a density of 50 to 3,000 pcs/100 $cm^2$, has an organic content of 0 to 2 wt % or below and generates a surface pressure of 5 to 500 kPa when heated to a temperature between 300 to 1,000° C. at a packing density of 0.15 to 0.45 $g/cm^3$ has been proposed. See Japanese Unexamined Patent Publication (Kokai) No. 2001-259438. Here, the retaining seal member 31 corresponds to the catalyst support mounting system. The catalytic converter 35 is interposed into an intermediate part of an exhaust pipe 37 from a car or other internal combustion engine 36 as shown in the drawing. The canning step is carried out by pushing under pressure the catalyst support 33 on which the retaining seal member 31 is wound from an open end of the casing as shown in FIG. 2.

In a catalytic converter having a construction similar to the one described above, a catalyst support mounting system has also been proposed (see Japanese Kokai No. 2002-4848) in which 0.5 to 20 wt % of an organic binder or a binder consisting of an inorganic binder is added to the mat-like matter formed by arranging an inorganic fiber in a mat form, a packing density is adjusted to be 0.1 to 0.6 $g/cm^3$ after assembly, and when the solid proportion of the binder added to the mat-like matter is equally divided into three parts (upper part, intermediate part and lower part) in the direction of thickness and is then evaluated, the solid proportion of the binder in each of the upper and lower parts is higher than the solid proportion in the intermediate part.

Japanese Kokai No. 2000-206421 discloses a retaining seal member for a catalytic converter that uses a ceramic fiber aggregated in a mat form as a constituent element, and arranged in a gap between the catalyst support and a metal shell covering the outer circumference of the catalyst support, wherein a concavo-convex structure of an inorganic material is provided to the outer surface of the ceramic fiber. In this retaining seal member, the concavo-convex structure of the inorganic material preferably consists of metal oxide particles.

SUMMARY OF THE INVENTION

Pollution control element mounting systems, for use in a pollution control device, must at least reliably retain the pollution control element (e.g., a catalyst support or filter element) in a desired position within the pollution control device for a long time. However, there continues to be a need for a mounting system that exhibits an improved ability to prevent slipping between the pollution control element and its mounting system that allows the pollution control element to move from its desired position within the pollution control device. The force needed to retain the pollution control element in the desired position within the pollution control device can be expressed by the following equation:

Retaining force=(the force exerted by the mounting system)×(the static coefficient of friction)

The force exerted by the mounting system can be determined from the pressure exerted by the mounting system within the pollution control device. This pressure can depend upon the degree to which the mounting system is compressed between the pollution control element and casing. Two retaining forces may need to be calculated, one between the mounting system and the pollution control element and one between the mounting system and the casing, because the coefficient of friction between each is typically different.

Therefore, one way of improving the retaining force of the pollution control element has been to increase the pressure generated by the mounting system by increasing the degree to which the mounting system is compressed. When the degree to which the mounting system is compressed is excessively increased, however, ceramic fiber and other inorganic fiber used in the mounting system can become fractured, broken or otherwise damaged. Such fiber damage can cause a drop in the force exerted by the mounting system (i.e., the retaining force) and erosion of the mounting system may occur or increase, which can result in the pollution control element breaking or otherwise being damaged.

When the metal oxide particles are allowed to adhere to the surface of the ceramic fiber constituting the catalyst support mounting system to impart the concavo-convex structure, as described in Japanese Kokai No. 2000-206421, a method that causes a suspension of the metal oxide particles to adhere to the surface of the ceramic fiber and then bakes the fiber at a high temperature is employed. Therefore, cross-linking or bonding occurs between the ceramic fibers, which reduces slippage between the ceramic fibers and causes the mounting system to harden, with the result that the mounting system becomes stiffer and less flexible. In general, this loss in flexibility can make the mounting system harder to work with. In particular, for example, cracks are more likely to occur in the mounting system during the assembly of the catalytic converter, especially when the mounting system is wound on the catalyst support.

The invention provides a mounting system that is less likely to exhibit the above described and other problems and that is useful in retaining a pollution control element, such as a catalyst support and a filter element, in a desired position within the pollution control device.

It is therefore an object of the invention to provide mounting systems for pollution control elements (e.g., catalyst supports and filter elements) that exhibit one or more or all of the following advantages: prevent or at least significantly limit movement or separation between the pollution control element and the mounting system when the two are assembled, for example pushed, into the housing of the pollution control device while the mounting system is wrapped around the pollution control element, can stably retain the pollution control element in position within the pollution control device after the pollution control element is loaded into the casing, and exhibit improved heat resistance, surface pressure retaining property, erosion resistance and processability.

It is another object of the invention to provide a pollution control device equipped with such a mounting system for its pollution control element.

The inventor of this invention has conducted intensive studies for solving the problems described above and has found that the reliability of retaining a pollution control element (e.g., a catalyst support or filter element), in a desired position within the pollution control device, can be improved without reducing the ability to assemble the pollution control device by using a mounting system for the pollution control element that is under a compressed state and that includes an arrangement of particles capable of increasing the coefficient of friction between a contact surface of the pollution control element and a contact surface of the mounting system.

According to one aspect of the present invention, a mounting system for a pollution control element is provided that comprises a mat that includes a fiber material suitable for use in a pollution control device. The mat can have a predetermined thickness. The mounting system can be arranged between the casing and the pollution control element under application of a compressive force. The mounting system further comprises fine particles of an abrasive material that are arranged at least on a surface of the mounting system so as to be in contact with an outer surface or side of the pollution control element.

According to another aspect of the present invention, a pollution control device is provided that comprises a casing, a pollution control element arranged inside the casing and a mounting system interposed in a gap between the casing and the pollution control element. The mounting system is in accordance with the principles of the present invention.

The pollution control devices according to the present invention can include, for example, catalytic converters and exhaust filter devices such as that used in the exhaust systems of internal combustion engines. Such engines include those used in vehicles (e.g., trains, automobiles, aircraft, watercraft, etc.) and power generation.

The above and other objects of the invention will be readily understood from the following detailed description thereof.

DETAILED DESCRIPTION OF THE INVENTION

Specific embodiments of the present invention related to catalytic converters will now be described in detail. It is understood that the present invention is not intended to be limited to such use. For example, the present invention is also be applicable to other pollution control devices such as, for example, exhaust filtering devices (e.g., diesel engine exhaust filter devices) According to the invention, when the mounting system of the present invention is used for a catalyst support, for example, the mounting system is arranged between the catalyst support and the metal casing under application of a compressive force, and preferably a predetermined compressive force. Therefore, undesirable movement of the catalyst support can be prevented by the compressive force (i.e., the surface frictional force) exerted by the surface of the mounting system. Because the fine particles of the abrasive material are arranged at least on the contact surface of the mounting system with the catalyst support, the coefficient of friction with the catalyst support can be increased and retaining reliability of the catalyst support can be further improved. Furthermore, when the catalyst support and the mounting system, which is wound around the catalyst support, are canned (i.e., assembled into the metal casing), the movement between the catalyst support and the wrapped mounting system can be prevented, or at least significantly reduced, without detrimentally affecting the ability of the catalytic converter to be assembled.

In summary, as can be understood from the following detailed explanation, the invention provides a catalyst support mounting system and a mounting system for other pollution control elements that can exhibit one or more or all of the following advantages: prevent or at least significantly limit movement or separation between the pollution control element and the mounting system when the two are assembled, for example pushed, into the housing of the pollution control device while the mounting system is wrapped around the pollution control element, can stably retain the pollution control element in position within the pollution control device after the pollution control element is loaded into the casing, and exhibit improved heat resistance, surface pressure retaining property, erosion resistance and processability.

The invention further provides a pollution control device equipped with such a mounting system for the pollution control element and excellent in durability and performance. The catalytic converter according to the invention can be used advantageously for processing an exhaust gas in a car engine and other internal combustion engines.

The mounting system for the pollution control element and the pollution control device according to the invention can advantageously be carried out in various forms, respectively. For example, the pollution control element may be a catalyst support (or a catalyst element), a filter element (for example, an exhaust purification filter for an engine) or other arbitrary pollution control elements. Similarly, the pollution control device can be a catalytic converter, an exhaust purification apparatus such as an exhaust purification apparatus for an engine (for example, a Diesel particulate filter apparatus) or other arbitrary pollution control devices in accordance with the pollution control element fitted thereto. Though the invention will specifically be explained with reference to a catalyst support mounting system and a catalytic converter, the invention is not particularly limited to the following embodiments.

The catalytic converter according to the invention is used particularly advantageously for processing an exhaust gas in a car engine and other internal combustion engines and is so constructed as to include at least a casing and a catalyst support (catalyst element) arranged inside the casing. A catalyst support mounting system according to the invention to be later described in detail is fitted between the casing and the catalyst support in such a fashion as to wind an outer peripheral surface of the catalyst support.

The catalyst support mounting system is preferably used while compressed to an appropriate level or in other words, under application of a predetermined compressive force, so as to acquire a suitable bulk density when it is fitted into the casing. Compression means includes clam shell compression, stuffing compression and tourniquet compression. The catalyst support mounting system according to the invention can be used advantageously for the production of a so-called "push-in structure" catalytic converter in which the catalyst support mounting system is pushed under pressure into a cylindrical casing, for example, as in stuffing compression.

When a casing capable of releasing such as clam shell compression is used, the problem such as friction does not occur when the catalyst support mounting system is pushed into the cylindrical casing.

The catalytic converter according to the invention includes catalytic converters of various types so long as they employ the push-in structure. The catalytic converter is preferably a catalytic converter equipped with a catalyst element shaped, for example, into a monolithic shape, that is, a monolithic catalyst support. Since this catalytic converter comprises a catalyst element having passages of a small honeycomb shape, it is smaller than pellet type catalytic converters of the prior art, can suppress an exhaust resistance while sufficiently securing a contact area with the exhaust gas, and can process more efficiently the exhaust gas.

The catalytic converter according to the invention can be advantageously used for processing the exhaust gas in combination with a variety of internal combustion engines. The excellent function and effect of the catalytic converter of the invention can be sufficiently acquired particularly when it is mounted to the exhaust system of automobiles such as a passenger car, a bus, a truck, and so forth.

Figure 3:
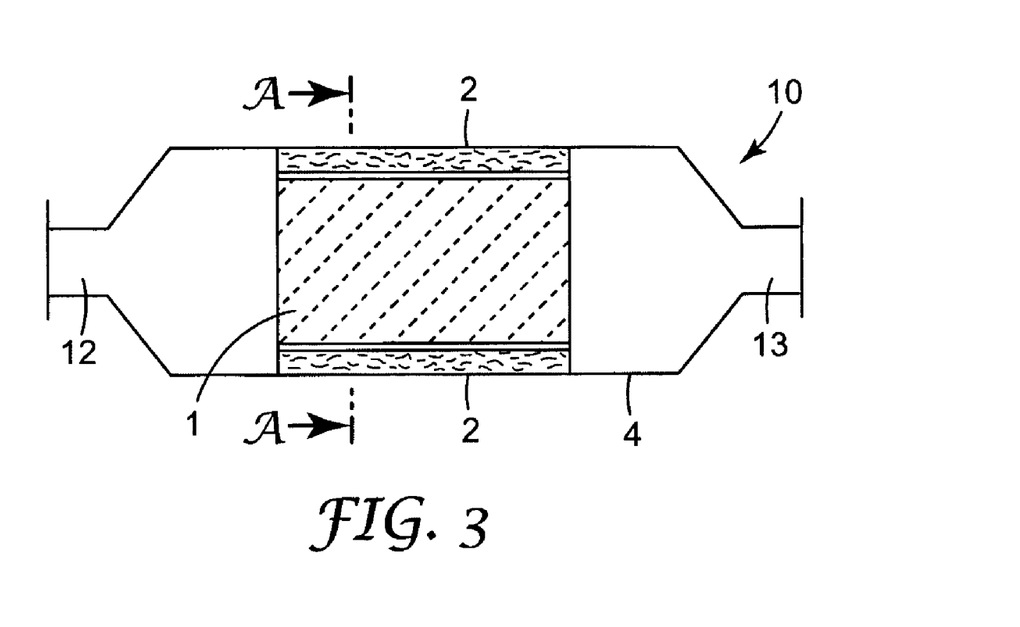
FIG. 3 is a sectional view showing a construction of a catalytic converter according to the invention.
Figure 4:
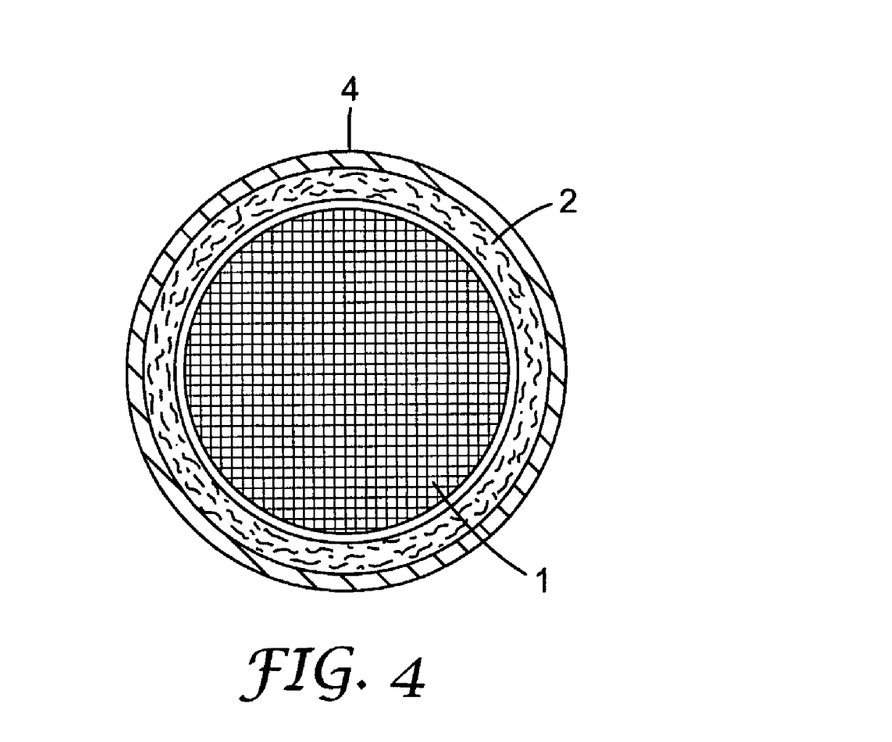
FIG. 4 is a sectional view of the catalytic converter taken along a line A-A in FIG. 3.

FIG. 3 is a sectional view showing a typical example of the catalytic converter according to the invention and shows principal portions of the catalytic converter under a cut state to have the construction more easily understood. FIG. 4 is a sectional view of the catalytic converter shown in FIG. 3 taken along a line A-A. As can be understood from these drawings, the catalytic converter 10 includes a metal casing 4, a monolithic solid catalyst support 1 arranged inside the metal casing 4 and a catalyst support mounting system 2 of the invention interposed between the metal casing 4 and the catalyst support 1. As will be explained hereinafter in detail with reference to FIGS. 5 to 9, the catalyst support mounting system 2 has a mat of a suitable fiber material having a predetermined thickness, within acceptable tolerances, and contains fine particles of an abrasive material under a contact state with the catalyst support on at least the inner peripheral surface of the mat on the catalyst support side. An exhaust gas inflow port 12 and an exhaust gas outflow port 13 each having a shape of a circular truncated cone is fitted to the catalytic converter 10. Incidentally, the fine particles of the abrasive material can be called "abrasives", too.

In the case of the catalytic converter 10 according to the invention, bonding means such as an adhesive or an adhesive sheet need not basically be interposed between the catalyst support 1 and the catalyst support mounting system 2. However, the bonding means may be used additionally when it does not adversely affect the function and effect of the invention but rather improves adhesion between the catalyst support 1 and the catalyst support mounting system 2 and the effect of facilitating the canning operation is expected. Preferably, the bonding means is partially used. The catalyst support mounting system 2 may have a protective coating that is not generally necessary but protects the surface of the catalyst support mounting system 2 from damage and the like.

Specifically, the solid catalyst support inside the metal casing is generally a ceramic catalyst support having a honeycomb structure having a plurality of exhaust gas passages. The catalyst support mounting system of the invention is arranged in such a fashion as to be conventionally wrapped completely around this catalyst support. Besides the function as a heat insulating material, the catalyst support mounting system mounts or retains the catalyst support inside the metal casing and seals the gap between the catalyst support and the metal casing. Therefore, the catalyst support mounting system prevents the exhaust gas from bypassing the catalyst support or at least minimizes such undesirable bypassing. The catalyst support is held tightly and moreover, flexibly, inside the metal casing.

In the catalytic converter according to the invention, its metal casing can be produced into an arbitrary shape from various metal materials known in the art in accordance with the desired function and effect. A suitable metal casing is made of a stainless steel and has the shape shown in FIG. 3. Needless to say, a metal casing having an arbitrary and suitable shape may be formed of metals such as iron, aluminum and titanium, or their alloys, whenever necessary.

In the similar way as the metal casing, the solid catalyst support can be shaped from the known materials used for ordinary catalytic converters into the known shape. A suitable catalyst support is well known to those skilled in the art and includes those which are produced from metals and ceramics. A useful catalyst support is disclosed in U.S. Reissued Patent No. 27,747. A ceramic catalyst support is commercially available from Corning Inc., U.S.A., for example. A honeycomb ceramic catalyst support is commercially available from Corning Inc. under a trade name "CELCOR" and from NGK Insulated Ltd. under a trade name "HONEYCERAM". The metal catalyst support is commercially available from Behr GmbH and Co., Germany. Incidentally, for the detail of the catalyst monolith, refer to SAE Technical Document Reference No. 900,500 "System Approach to Packaging Design for Automotive Catalytic Converters" by Stroom et al, SEA Technical Document Reference No. 800,082 "Thin Wall Ceramics as Monolithic Catalyst Support" by Howitt and SAE Technical Document Reference No. 740,244 "Flow Effect in Monolithic Honeycomb Automotive Catalytic Converter" by Howitt et al, which are all incorporated herein by reference in their entirety.

Catalysts that are to be supported on the catalyst support described above are generally metals (e.g. platinum, ruthenium, osmium, rhodium, iridium, nickel and palladium) and metal oxides (vanadium pentoxide, titanium dioxide, etc) and are preferably used in the form of coating. Such coating of the catalyst is described in detail in U.S. Pat. No. 3,441,381.

In the practice of the invention, the catalytic converter can be produced into various constructions and by various methods without departing from the scope of the invention. Preferably, the catalyst is produced by accommodating a honeycomb-shaped ceramic catalyst support into a metal casing and a final catalyst support (catalyst element) can be produced by supporting a catalyst layer (coating of catalyst) formed of a precious metal such as platinum, rhodium or palladium on a ceramic monolith having a honeycomb shape, for example. When such a construction is employed, an effective catalytic operation can be acquired at a relatively high temperature.

According to the invention, the catalyst support mounting system of the invention is arranged between the metal casing and the catalyst element disposed inside the metal casing. The catalyst support mounting system is formed of a mat, a blanket, etc., of a suitable fiber material having a desired thickness. The catalyst support mounting system may comprise one member in the form of a single mat or may be in the form of a composite member, for example, by stacking and optionally bonding two or more mats together. The catalyst support mounting system generally has the form of the mat or the blanket for ease of handling but other forms may also be used, whenever necessary. The size of the catalyst support mounting system can be changed within a broad range in accordance with the object of use. When the mat-like catalyst support mounting system is fitted to the catalytic converter of, for example, a car or passenger vehicle and is used, the mounting system generally has a thickness of about 1.5 to about 15 mm, a width of about 200 to about 500 mm and a length of about 100 to about 1,500 mm. Such a mounting system may be cut into a desired shape and into a desired size with scissors, cutters, etc, and may be used under such a state.

The catalyst support mounting system is constructed from a fiber material and preferably from an inorganic fiber. The inorganic fiber suitable for forming the catalyst support mounting system can include glass fiber, ceramic fiber (e.g., refractory ceramic 15 fiber), carbon fiber, silicon carbide fiber and boron fiber. Other inorganic fibers may also be used as well, whenever necessary or appropriate. These inorganic fibers may be used either individually or in combination of two or more kinds. Among these inorganic fibers, ceramic fibers such as alumina fibers, a silica fibers and alumina-silica fibers are used particularly preferably and among others, the alumina fibers and the alumina-silica fibers are used preferably. These ceramic fibers may be used either individually or in combination of two or more kinds in the form of composite fibers and other forms. Other inorganic materials may be used as an additive in combination with the ceramic fibers described above and other inorganic fibers. Suitable examples of additives may include zirconia, magnesia, calcia, chromium oxide, yttrium oxide and lanthanum oxide, though the examples are in no way restrictive. These additives are generally used in the form of powder and fine particles, and may be used either individually or in combination of two or more kinds.

Specifically, the inorganic fiber used in the catalyst support mounting system can include an inorganic fiber containing alumina ($Al_2O_3$) and silica ($SiO_2$), for example. Here, the inorganic fiber has two components of alumina and silica, and blend ratio of alumina to silica preferably falls within the range of about 40:60 to about 96:4. When the blend ratio of alumina and silica comes off from this range such as when the blend ratio of alumina is below 40%, for example, the problem of deterioration of the heat resistance occurs.

The thickness (mean diameter) of the inorganic fiber is not particularly limited but the mean diameter is preferably from about 2 to 7 μm. When the inorganic fiber has a mean diameter smaller than about 2 μm, the fiber is likely to become brittle and to lack sufficient strength. When the inorganic fiber has a mean diameter greater than about 7 μm, on the contrary, molding of the mounting system is likely to be difficult.

The length of the inorganic fiber is not particularly limited in the same way as the thickness. However, the inorganic fiber preferably has a mean length of about 0.5 to 50 mm. When the mean length of the inorganic fiber is smaller than about 0.5 mm, the effect of forming the mounting system by using such a fiber can be difficult or impossible to achieve. When the mean length exceeds about 50 mm, on the contrary, handling property gets deteriorated, so that the production process of the mounting system can be very difficult or impossible to be carried out smoothly.

According to another method, an alumina fiber mat consisting mainly of stacked sheets of the alumina fiber, too, can be advantageously used as the catalyst support mounting system when executing the invention. In such an alumina fiber mat, the mean length of the alumina fiber is generally within the range of from about 20 mm to about 200 mm and the thickness (mean diameter) of the fiber is generally within the range of from about 1 μm to about 40 μm. The alumina fiber preferably has a mullite composition having an $Al_2O_3/SiO_2$ weight ratio in the range of from about 70/30 to about 74/26.

The alumina fiber mat described above can be produced by spinning a sol gel consisting of a mixture of an alumina source such as aluminum oxychloride, a silica source such as silica sol, an organic binder such as polyvinyl alcohol and water. In other words, alumina fiber precursors that are spun are stacked into a sheet, then preferably subjected to needle punching and generally baked at a high temperature in the range of from about 1,000° C. to about 1,300° C.

The needle punching treatment described above provides the effect that a part of the fiber is oriented in a longitudinal direction with respect to the stacked surface. Therefore, because a part of the alumina fiber precursor inside the sheet penetrates through the sheet, is oriented in the longitudinal direction and fastens the sheet, the bulk specific gravity of the sheet can be increased and peel and deviation among the layers can be prevented. The density of needle punching can be changed within a broad range but is generally within the range of about 1 to 50 punches/cm$^2$. The thickness of the mat, the bulk specific gravity and the strength can be adjusted depending on the density of needle punching.

In the production of the alumina fiber mat described above, other ceramic fibers and inorganic expanding agents may be added in supplementation to the alumina fiber. In this case, the additives may be uniformly mixed into the mat but when the additives are so added locally as to avoid those portions which are heated, the cost can be lowered while performance of the additives are kept. The ceramic fiber described above is the silica fiber or the glass fiber and the inorganic expanding agent is bentonite, unexpanded vermiculite or expandable graphite.

Figure 5:
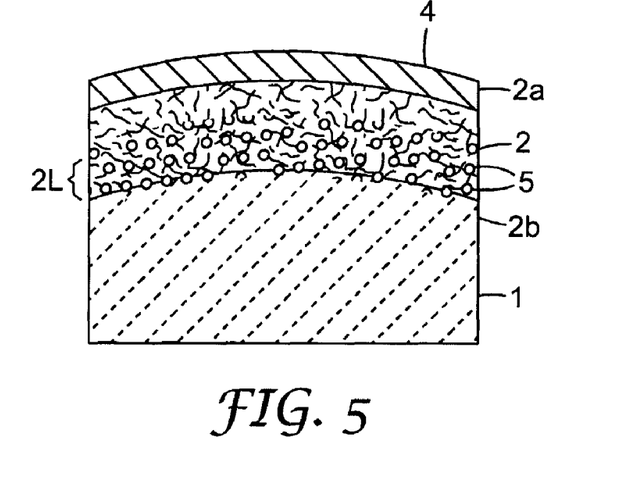
FIG. 5 is a sectional view showing a distribution state of abrasive fine particles in a catalyst support mounting system in the catalytic converter shown in FIG. 3.

Referring to FIG. 5, a catalytic converter according to the present invention can include the casing 4, the catalyst support 1 loaded into the casing 4 and the mat 2 of the fiber material having a desired thickness and interposed between the casing 4 and the catalyst support 1 under the state where the mat 2 is wound around the outer peripheral surface of the catalyst support 1. Fine particles 5 of the abrasive material capable of improving the coefficient of friction with the catalyst support are arranged on at least the inner peripheral surface 2b of the mat-like catalyst support mounting system 2 on the outer surface or side of the catalyst support 1. As can be understood from the drawing, the fine particles of the abrasive material are not arranged basically on the opposite surface of the catalyst support mounting system 2, that is, on the outer peripheral surface 2a on the side of the casing 4. The term "at least" used herein means the state where the fine particles 5 of the abrasive material are distributed either wholly or partially on the inner peripheral surface 2b of the catalyst support mounting system, preferably wholly and substantially uniformly, and the state where the fine particles 5 of the abrasive material are distributed in the direction of depth of the catalyst support mounting system 2. Incidentally, when the fine particles 5 of the abrasive material are distributed in the direction of depth of the catalyst support mounting system 2, the fine particles 5 of the abrasive material are generally distributed in such a fashion that the concentration of the particles 5 increases towards the inner peripheral surface 2b when the catalyst support mounting system 2 is viewed in the direction of thickness, though the distribution varies depending on the application method of the fine particles 5 of the abrasive material. Particularly preferably, the fine particles 5 of the abrasive material are contained in a content of at least 70% of the total amount of the fine particles 5 contained in the catalyst support mounting system 2 in a lower layer region 2L extending to the depth of 50% from the inner peripheral surface 2b.

In the practice of the invention, the fine particles of various abrasive materials can be used to improve the coefficient of friction with the catalyst support. Because the abrasive material can contribute to the improvement of the coefficient of friction, the abrasive material used in the invention can also be called a "friction material". Suitable examples of the abrasive material include metal oxides having heat resistance (for example, alumina, mullite, zirconia, magnesia, titania, etc), SiC, boron nitride and boron carbide, though they are in no way restrictive. These abrasive materials may be used either individually or in combination of two or more kinds.

The abrasive material described above is generally used in the form of fine particles. The fine particles of the abrasive material can be used in various diameters depending on the kind of the abrasive material and the intended addition effect but preferably have a particle size of about F1,200 to about F60 in terms of the particle size of the abrasive material stipulated by JIS R60001. When the particle size of the fine particles of the abrasive material is smaller than F1,200, the desired improvement effect of the coefficient of friction cannot be accomplished, or is at least significantly diminished, in some cases because the fine particles of the abrasive material can become embedded into the inorganic fiber and away from the surface of the catalyst support mounting system. When an organic binder is used in combination for producing the catalyst support mounting system, for example, the fine particles of the abrasive material that are bonded to the binder are more likely to migrate into the clearances or spaces between the inorganic fibers, when combustion of the binder occurs, for example during the operation of the internal combustion engine. When the particle size of the fine particles of the abrasive material exceeds F60, on the contrary, the anchoring effect on the catalyst support may become insufficient. Preferred results can be obtained with fine particles of the abrasive material that have an average particle size in the range of from about 30 μm (approximately F406) to about 300 μm (F80), as well as a particle size in the range of from about F240 (70 μm) to about F80 (300 μm).

Figure 6:
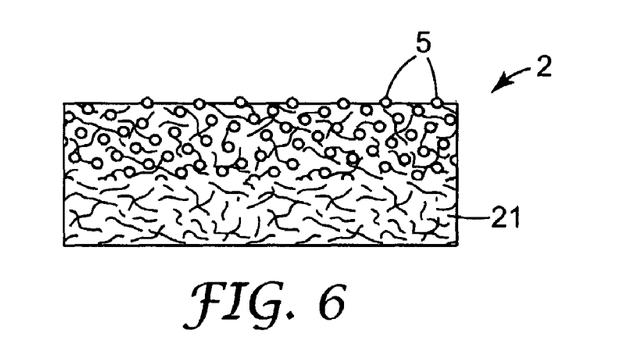
FIG. 6 is a sectional view showing a preferred example of a catalyst support mounting system according to the invention.

As described above, the catalyst support mounting system of the invention may be used in the form of the single mat or in the form of the composite mat. FIG. 6 is a sectional view showing an example of the catalyst support mounting system 2 in the form of the single mat. The catalyst support mounting system 2 can have the same construction as that of the catalyst support mounting system 2 explained previously with reference to FIG. 5. In other words, the catalyst support mounting system 2 can comprise the inorganic fiber 21 and contain the fine particles 5 of the abrasive material under the state where the fine particles 5 concentrate on a region of one of the surfaces (surface on the contact side with the catalyst support) while a part thereof is exposed on the surface.

When the catalyst support mounting system of the invention is used in the form of the composite mat, various composite forms can be taken. However, in general, the composite mat can be constructed using one abrasive-containing mat and at least one auxiliary mat formed of the fiber material that is the same as or different from the fiber material of the abrasive-containing mat. The fiber material of the auxiliary mat preferably is the inorganic fiber described above. Basically, the auxiliary mat does not contain the particles of the abrasive material as also described above. From the aspect of the property, the auxiliary mat may be a so-called "non-expandable or non-intumescent mat" or may comprise the combination of the non-expandable mat and a so-called "thermo-expandable or intumescent mat".

Figure 7:
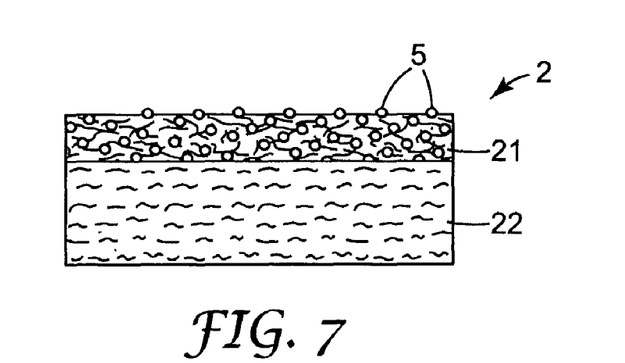
FIG. 7 is a sectional view showing another preferred example of the catalyst support mounting system according to the invention.
Figure 8:
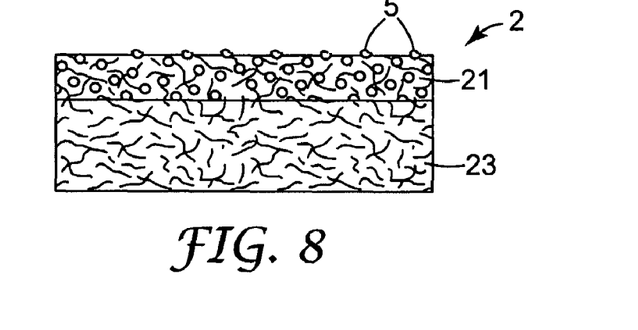
FIG. 8 is a sectional view showing still another preferred example of the catalyst support mounting system according to the invention.
Figure 9:
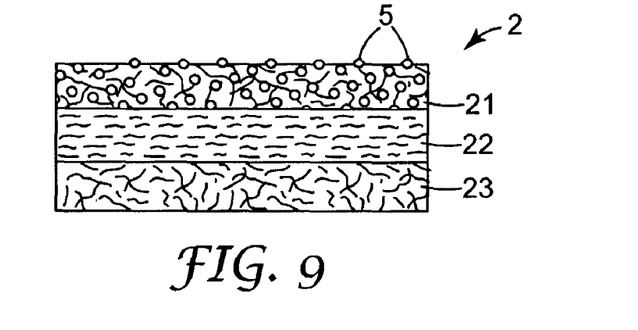
FIG. 9 is a sectional view showing still another preferred example of the catalyst support mounting system according to the invention.

FIGS. 7 to 9 are sectional views each showing an example of a composite mat suitable for the practice of the invention.

FIG. 7 shows an example where the abrasive-containing mat 21 of the invention and the auxiliary mat of the non-expandable mat are integrally combined to form a catalyst support mounting system 2 having the form of the composite mat. In the catalyst support mounting system 2 shown in the drawing, the abrasive-containing mat 21 is formed of the inorganic fiber, the fine particles of the abrasive material and the organic binder. On the other hand, the non-expandable mat 22 is formed of the inorganic fiber and the organic binder. To form the abrasive-containing mat 21 and the non-expandable mat 22, the same or different inorganic fibers may be used. For example, it is possible to use the alumina fiber having high heat resistance for forming the abrasive-containing mat 21 and the alumina silica fiber or the glass fiber for forming the non-expandable mat 22. Otherwise, it is possible to use the alumina silica fiber for forming the abrasive-containing mat 21 and the glass fiber for forming the non-expandable mat 22.

When the catalyst support mounting system of the invention is produced by a wet process, it is customary to use the inorganic fiber and the organic binder in combination as described above. In the practice of the invention, however, the kind of the organic binder and its use amount are not particularly limited but can be used in a customary manner. For example, it is possible to use, as the organic binder, an acryl resin, a styrene-butadiene resin, an acrylonitrile resin, a polyurethane resin, a natural rubber, a polyvinyl acetate resin, etc, that are provided in the form of latex. Such an organic binder may contain a flexible thermoplastic resin such as an unsaturated polyester resin, an epoxy resin, a polyvinyl ester resin, and so forth.

FIG. 8 is an example where a catalyst support mounting system 2 having a form of a composite mat is formed by integrally combining the abrasive-containing mat 21 of the invention with an auxiliary mat 23 of a thermo-expandable or intumescent mat. In the catalyst support mounting system 2 shown in the drawing, the abrasive-containing mat 21 is formed of an inorganic fiber, fine particles of an abrasive material and an organic binder while the thermo-expandable mat 23 is formed of the inorganic fiber, the organic binder and a thermo-expandable or intumescent material. To form the abrasive-containing mat 21 and the thermo-expandable mat 23, the same or different inorganic fibers may be used. For example, it is possible to use the alumina silica fiber or the alumina fiber having high heat resistance, whenever necessary, for forming the abrasive-containing mat 21 and to use the alumina silica fiber or the glass fiber for forming the thermo-expandable mat 23. Unexpanded vermiculite or expandable graphite, for example, can be used as the thermo-expandable material to form the thermo-expandable mat 23.

FIG. 9 shows an example where a catalyst support mounting system having a form of a three-layered composite mat is produced by integrally combining the abrasive-containing mat 21 of the invention with a first auxiliary mat 22 of a non-expandable mat and a second auxiliary mat 23 of a thermo-expandable mat. In the catalyst support mounting system 2 shown in the drawing, the abrasive-containing mat 21 is formed of the inorganic fiber, the fine particles of the abrasive material and the organic binder. On the other hand, the non-expandable mat 22 is formed of the inorganic fiber and the organic binder and the thermo-expandable mat 23 is formed of the inorganic fiber, the organic binder and the thermo-expandable material. The abrasive-containing mat 21, the non-expandable mat 22 and the thermo-expandable mat 23 can be formed in the manner described above, respectively. In this example, both of the abrasive-containing mat 21 and the non-expandable mat 22 are preferably formed of the alumina fiber having high heat resistance. On the other hand, the thermo-expandable mat 23 can be formed by use of the alumina fiber, the glass fiber, or the like, in combination with the thermo-expandable material such as unexpanded vermiculite or expandable graphite.

Incidentally, it is assumed that the following mechanism for improving the force of friction operates in the mounting system of the invention though the following description limits in no way the operation of the catalyst support mounting system of the invention.

The retaining performance of the present mounting system can be expressed by "retaining force" that is the product of the pressure generated by compression of the mounting system and the static frictional coefficient between the pollution control element and the mounting system as described already. Here, the mounting systems that have generally been used in the past are formed of inorganic fiber and organic binder and secure sufficient clearances among or spaces between the inorganic fibers so as to generate the pressure due to compression while suppressing damage of the fibers. According to the observation made by the inventor of the present invention, these clearances or spaces among the inorganic fibers result in the decrease of the contact area between the catalyst support and the catalyst support mounting system, which eventually limits the coefficient of friction between the catalyst support and the catalyst support mounting system.

The inventor has found out that, when the inorganic particles having heat resistance are arranged, and preferably bonded in place, on the side or surface of the mounting system that makes contact with the pollution control device, preferably a portion having a predetermined thickness, the contact area between the pollution control element and the mounting system can be increased and furthermore, the coefficient of friction between the pollution control element and the mounting system can be improved. In particular, the inorganic particles fixed to the mounting system by the organic binder can migrate into the clearances or spaces among the fibers that are in contact with the pollution control element, especially after combustion of the organic binder. It is believed that the particles are at least assisted in migrating to these spaces by high pressure that the mounting system is under, when installed in the pollution control device. In other words, it is believed that the particles can be effectively squeezed into these spaces by the pressure exerted by the mounting system. By filling the spaces between the mounting

TABLE 1

| sample | abrasive | material | particle size | addition amount (%) | static frictional force (kgf) | static frictional coefficient | vs control (%) |
|---|---|---|---|---|---|---|---|
| control | — | — | — | — | 37.5 | 0.76 | 100 |
| 1 | SA-J01 | alumina | F80 | 4 | 39.2 | 0.80 | 105 |
| 2 | SA-J01 | alumina | F80 | 24 | 41.3 | 0.84 | 110 |
| 3 | SA-J01 | alumina | F80 | 64 | 46.3 | 0.94 | 123 |

TABLE 1-continued

| sample | abrasive | material | particle size | addition amount (%) | static frictional force (kgf) | static frictional coefficient | vs control (%) |
|---|---|---|---|---|---|---|---|
| 4 | SA-J01 | alumina | F240 | 4 | 40.8 | 0.83 | 109 |
| 5 | SA-J01 | alumina | F240 | 24 | 43.0 | 0.88 | 115 |
| 6 | SA-J01 | alumina | F240 | 64 | 41.9 | 0.85 | 112 |
| 7 | C | SiC | F80 | 4 | 42.8 | 0.87 | 114 |
| 8 | C | SiC | F80 | 24 | 39.4 | 0.80 | 105 |
| 9 | C | SiC | F80 | 64 | 41.9 | 0.86 | 112 |
| 10 | C | SiC | F240 | 4 | 40.7 | 0.83 | 109 |
| 11 | C | SiC | F240 | 24 | 44.3 | 0.90 | 118 |
| 12 | C | SiC | F240 | 64 | 38.8 | 0.79 | 104 |
| 13 | RZ-8C | Zirconia | F325 | 4 | 42.5 | 0.87 | 113 |
| 14 | RZ-8C | Zirconia | F325 | 24 | 45.5 | 0.93 | 121 |
| 15 | RZ-8C | Zirconia | F325 | 64 | 38.7 | 0.79 | 103 |
| 16 | R5N | titania | 0.25 μm* | 24 | 38.9 | 0.79 | 104 |
| 17 | R5N | titania | 0.25 μm* | 64 | 44.6 | 0.91 | 119 |

Remarks)
*Average particle diameter of abrasive system and the pollution control element, the particles increase the contact area between the mounting system and the pollution control element. Alternatively or in addition, this same technique can be applied, if desired, to increase the contact area between the mounting system and the casing or housing of the pollution control device. Once the particles have reached a state of equilibrium, including those that have migrated into the spaces, the pressure exerted by the mounting system tends to prevent, or at least inhibit, further movement of the particles, especially out of the mounting system.

The mounting system according to the present invention can be generally produced by a wet-laid process, such as that used in paper making or, for example, as described in the published International (PCT) Patent Application No. WO2004061279, filed Nov. 17, 2003; and U.S. Pat. No. 6,051,193, filed Feb. 7, 1997, which are incorporated herein by reference in their entirety. Generally, after the inorganic fiber and the organic binder as the starting materials are mixed with arbitrary additives, process steps such as opening of the inorganic fiber, preparation of slurry, shaping by paper-making and pressing of a mold are serially carried out to obtain an intended mounting system. It is also possible to produce the mounting system by combining a wet process with a dry process, or to use a dry process in place of a wet process depending on the construction of the mounting system. The dry process can be carried out by a known and customary process and is typically a dry process using a needle punch.

The explanation will be given more specifically. A catalyst support mounting system in a composite mat form including a mat containing abrasive particles and an auxiliary mat not containing the abrasive particles can be produced in the following ways, for example.

Production method A:

First slurry containing an inorganic fiber and an organic binder and second slurry containing an inorganic fiber, fine particles of an abrasive material and an organic binder are prepared. A precursor of an auxiliary mat is formed from the first slurry by an ordinary paper-making process and a precursor of the abrasive-containing mat is similarly formed from the second slurry on the resulting precursor by the customary paper-making process. Next, a laminate of these two precursors are guided to and compressed between a pair of pressure rollers to achieve a high density. Finally, the laminate after pressing is heated between a pair of heating rollers and dried to give a two-layer integral type mat-like catalyst support mounting system.

Production method B:

First slurry containing an inorganic fiber and an organic binder is prepared and a precursor of an auxiliary mat is formed from the first slurry by an ordinary paper-making process. Second slurry containing an inorganic fiber, fine particles of an abrasive material and an organic binder is prepared and a precursor of an abrasive-containing mat is similarly formed from the second slurry by the customary paper-making process. Next, the resulting two precursors are bonded and integrated by arbitrary bonding means such as an ordinary adhesive, resin or double-face tape, or mechanical fitting means such as stapling or stitching to give a two-layer integral type mat-like catalyst support mounting system.

Production method C:

Alumina fiber precursor sol gel used for an inorganic salt process is prepared and is spun, followed then by stacking, needle punching and baking at a predetermined temperature. Next, slurry prepared by dispersing fine particles of an abrasive material in an organic binder is applied to the surface of the resulting alumina fiber blanket and is dehydrated by suction. There is thus obtained a mat-like catalyst support mounting system in which fine particles of the abrasive material are selectively dispersed and fixed on the surface of the alumina fiber blanket.

Production method D:

Alumina fiber precursor sol gel used for an inorganic salt process is prepared and is spun, followed then by stacking, needle punching and baking at a predetermined temperature. Next, slurry consisting of an inorganic fiber, fine particles of an abrasive material and an organic binder is applied to the surface of the resulting alumina fiber blanket and is dehydrated by suction.

EXAMPLES

Subsequently, the invention will be explained with reference to examples thereof. Incidentally, the invention is not of course limited by these examples.

An alumina silica fiber (product of Mitsubishi Kagaku Sanshi) consisting of 72 wt % of alumina and 28 wt % of silica was first prepared and 88 wt % of this fiber and 12 wt % of acryl type latex ("Nippol LX-816", product of Nippon Zeon K. K.) were mixed to give first slurry. When this slurry was prepared, the water content was adjusted so that a solid concentration became 5 wt %. Next, the first slurry was dehydrated and shaped into a sheet on a mesh to give a sheet-like mold. The mold was then compressed by use of pressure rollers to attain a high density. Next, the resulting high density mold was dried at 130° C. for 20 minutes by use of heating rollers to give a non-expandable mat. A mean surface density of this non-expandable mat was about 1,200 g/m². Incidentally, this non-expandable mat was used also as a Control Sample in order to compare it with a composite mat of the invention in the following evaluation test.

Fine particles of abrasive materials (called hereby "abrasive particles") listed in the following Table 1 were blended at different particle size or particle diameters and in addition amounts to mixtures of 88wt % of an alumina silica fiber (product of Saffil Co.) consisting of 72 wt % of alumina and 28 wt % of silica and 12 wt % of acryl type latex ("Nippol LX-816", product of Nippon Zeon K. K.) to give second slurries. Alumina abrasive: "Type SA-J01" (product of Showa Denko)

Silicon carbide abrasive: Type "C" (product of Showa Denko)

Zirconia abrasive: Type "RZ-8C" (product of Showa Denko)

Titania abrasive: Type "R5N" (product of Sakai Kagaku Kogyo)

When the second slurry was prepared, the water content was adjusted so that a solid concentration became 5 wt %. Next, the second slurry was dehydrated and shaped into a sheet on a mesh to give a sheet-like mold. The mold was then compressed by use of pressure rollers to attain a high density. Next, the resulting high density mold was dried at 130° C. for 20 minutes by use of heating rollers to give an abrasive-containing mat. A mean surface density of this abrasive-containing mat was about 200 g/m².

Subsequently, the non-expandable mats and the abrasive-containing mats produced in the manner described above were laminated and were bonded by use of an acryl adhesive. There were thus obtained laminate integration type composite mats each having a length of 260 mm, a width of 90 mm and a thickness of 12.5 mm. These composite mats were called "Samples 1 to 17".

Evaluation Test (Measurement of Frictional Force):

To measure the coefficient of friction as the catalyst support when used in the catalytic converter, the frictional force of each of the catalyst support mounting systems (mats) of Samples 1 to 17 and Control was measured in the following way by use of an autograph "AGS100D", a product of Shimazu Seisakusho K. K.

Figure 10:
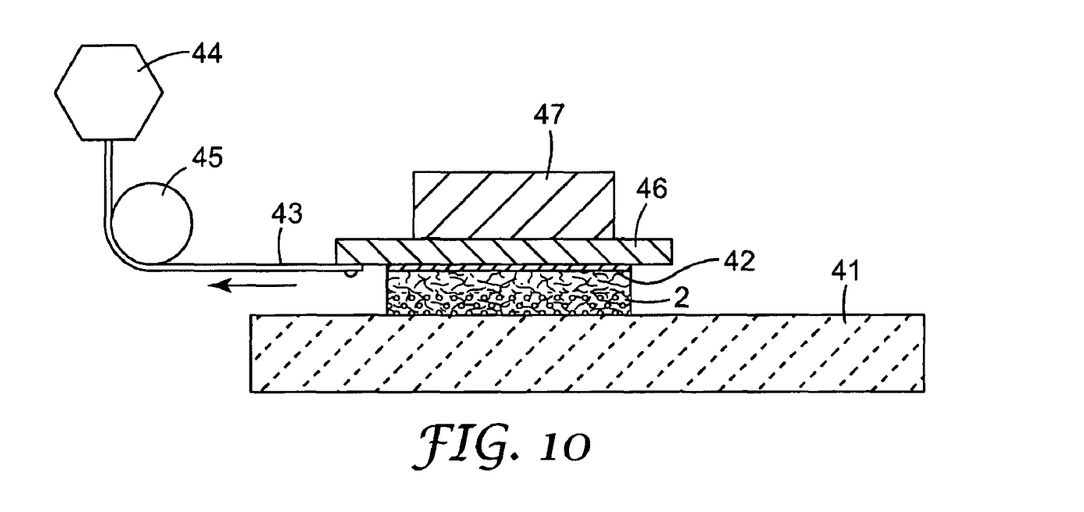
FIG. 10 is a sectional view typically showing a method of measuring a coefficient of friction of the catalyst support mounting system.

Each sample was cut into a test piece having a length of 50 mm, a width of 25 mm and a thickness of 12.5 mm. Next, as shown in FIG. 10, the surface of the test piece 2 opposite to the contact surface with a catalyst support (here, a monolith body of Nippon Glass Co.) was bonded to a SUS sheet (stainless steel sheet) 46 through a double-face tape.

Next, an about 1 m-long stainless steel cord 43 was prepared and one of the ends of the cord was fixed to the SUS sheet 46. A pulley 45 was arranged immediately below a load cell 44 and the other end of the stainless steel cord 43 was fixed to the load cell 44 in such a fashion that the SUS sheet 46 to which the test piece 2 was fixed moved parallel to the ground surface when the load cell 44 moved up.

Next, the test piece 2 was put on the catalyst support 41 in such a fashion that the center axis of the catalyst support 41 opposed front ways the pulley 45 and was parallel to the ground surface. The height of the load cell 44 was adjusted so that the test piece 2 was placed at the position most spaced apart from the pulley 45.

After a 49N load 47 was fixed onto the SUS sheet 46, the load cell 44 was moved up and the stainless steel cord 43 was pulled at a tensile speed of 100 mm/min in a direction indicated by an arrow. The load at the point immediately before the test piece 2 started sliding on the surface of the catalyst support 41 was recorded as the static frictional force (kgf). This value was divided by the load to the test piece 2 inclusive of the SUS sheet 46 to thereby calculate the static frictional coefficient. The measurement results were altogether listed in the following table 1.

As could be understood from the measurement results tabulated in Table 1, the coefficient of friction with the catalyst support could be improved by 13% by adding the fine particles of the abrasive material to the surface of the catalyst support mounting system (the composite mat in this example) in accordance with the invention, and reliability in the catalyst support mounting system could be improved.

Production of Pollution Control Device (e.g., a Catalytic Converter):

As to those samples which were judged as excellent in the evaluation test described above, each composite mat used for the production was wound round an outer circumference of a pollution control element or body (e.g., a monolithic catalyst support), a product of Nippon Gaishi K. K., having an outer diameter of 78 mm and a length of 100 mm and prepared separately. Next, the catalyst support wound by the composite mat was pushed into a cylindrical stainless steel casing having an inner diameter of 84 mm and a length of 120 mm at a rate of 40 mm/sec by using a guide cone. The gap between the catalyst support and the casing was about 3 mm during this canning process. The intended catalytic converter could be produced without inviting problems such as breaking of or otherwise damaging the catalyst support and/or the composite mat, or a drop in the ability to assemble the catalytic converter. Furthermore, the resulting catalytic converter could sufficiently exhibit its intended exhaust purification operation in an actual use.

From the above disclosure of the general principles of the present invention and the preceding detailed description, those skilled in this art will readily comprehend the various modifications, re-arrangements and substitutions to which the present invention is susceptible. For example, a mounting system according to the present invention can comprise a base mat with a high friction layer or coating on both sides. One high friction layer can comprise ceramic fibers (e.g., refractory ceramic fibers) impregnated with abrasive particles and can be co-formed with the mat using a wet-laid process like that disclosed in, for example, the published International (PCT) Patent Application No. WO2004061279, filed Nov. 17, 2003; and U.S. Pat. No. 6,051,193, filed Feb. 7, 1997. The other high friction layer can comprise a layer of a silica sol (colloidal silica) that is roll coated onto the mat. Therefore, the scope of the invention should be limited only by the following claims and equivalents thereof.

What is claimed:

1. A mounting system suitable for mounting a pollution control element inside a pollution control device, said mounting system comprising:
  a mat comprising fiber material suitable for use in a pollution control device, said mat having a thickness; and
  inorganic particles coated onto a contact surface of said mat so as to be in contact with an outer surface of the pollution control element, when said mounting system is used in the pollution control device, wherein said inorganic particles have heat resistance and are capable of increasing the coefficient of friction between the contact surface of said mat and the outer surface of the pollution control element.

2. A mounting system as defined in claim 1, wherein said fiber material is at least one kind of inorganic fiber selected from the group consisting of a glass fiber, a ceramic fiber, a carbon fiber, a silicon carbide fiber and a boron fiber.

3. A mounting system as defined in claim 1, wherein said fiber material is a ceramic fiber selected from the group consisting of an alumina fiber, a silica fiber, an alumina silica fiber and their combinations.

4. A mounting system as defined in claim 3, wherein said ceramic fiber contains at least one kind of additive selected from the group consisting of zirconia, magnesia, calcia, chromium oxide, yttrium oxide and lanthanum oxide.

5. A mounting system as defined in claim 1, wherein said particles are contained in a content of at least 70% of the total content contained in said mat in a lower region ranging from said surface of said mat down to a 50% depth when said mat is viewed in a direction of its thickness.

6. A mounting system as defined in claim 1 wherein said particles are dispersed in such a fashion that the concentration thereof increases towards said surface of said mat when said mat is viewed in a direction of its thickness.

7. A mounting system as defined in claim 1, wherein said inorganic particles are made alumina, mullite, zirconia, magnesia, titania, boron nitride, boron carbide or a combination thereof.

8. A mounting system as defined in claim 1, wherein said inorganic particles are made of abrasive material.

9. A mounting system as defined in claim 1, wherein said particles have a particle size in the range of from about F1,200 to about F60 in terms of an abrasive particle size stipulated by JIS R6001.

10. A mounting system as defined in claim 1, wherein said mounting system comprises a single mat.

11. A mounting system as defined in claim 1, wherein said mounting system is a composite mat comprising said mat and at least one auxiliary mat comprising an inorganic fiber material that is the same as, or different from, the fiber material of said mat.

12. A mounting system as defined in claim 11, wherein said auxiliary mat does not contain said inorganic particles.

13. A mounting system as defined in claim 11, wherein said auxiliary mat is an intumescent mat.

14. A pollution control device comprising a casing, a pollution control element arranged inside said casing and a mounting system as defined in claim 1, wherein said mounting system is interposed between said casing and said pollution control element so as to retain said pollution control element in a desired position within said casing.

15. A pollution control device as defined in claim 14, wherein said pollution control element is a catalyst support and said pollution control device is a catalytic converter.

16. A pollution control device as defined in claim 14, wherein said pollution control element is a filter element and said pollution control device is an exhaust filtering device.

17. An exhaust system for an internal combustion engine comprising a pollution control devices as defined in claim 14.

18. An internal combustion engine comprising an exhaust system as defined in claim 17.

19. A vehicle comprising an internal combustion engine as defined in claim 18.

20. A power generator comprising an internal combustion engine as defined in claim 18.

* * * * *

UNITED STATES PATENT AND TRADEMARK OFFICE
CERTIFICATE OF CORRECTION

| | | |
|---|---|---|
| PATENT NO. | : 7,858,051 B2 | Page 1 of 1 |
| APPLICATION NO. | : 11/572075 | |
| DATED | : December 28, 2010 | |
| INVENTOR(S) | : Kenji Sako | |

It is certified that error appears in the above-identified patent and that said Letters Patent is hereby corrected as shown below:

Page 2, right column, line 12 under OTHER PUBLICATIONS, delete "Fiberfax®" and insert -- Fiberfrax® --.

Col. 8, line 9, after "ceramic" delete "15".

Col. 17, line 26, delete "claim 1" and insert -- claim 1, --.

Col. 17, line 32, after "made" insert -- of --.

Signed and Sealed this
Nineteenth Day of July, 2011

David J. Kappos
*Director of the United States Patent and Trademark Office*